US008738902B2

(12) United States Patent
Yoo et al.

(10) Patent No.: US 8,738,902 B2
(45) Date of Patent: May 27, 2014

(54) IMPLICIT SSL CERTIFICATE MANAGEMENT WITHOUT SERVER NAME INDICATION (SNI)

(75) Inventors: Won Suk Yoo, Redmond, WA (US); Eok Kim, Bothel, WA (US); Jenny Lawrance, Redmond, WA (US); Aniello Scotto Di Marco, Redmond, WA (US); Yamini Jagadeesan, Redmond, WA (US); Wade Hilmo, Snohomish, WA (US)

(73) Assignee: Microsoft Corporation, Redmond, WA (US)

( * ) Notice: Subject to any disclaimer, the term of this patent is extended or adjusted under 35 U.S.C. 154(b) by 165 days.

(21) Appl. No.: 13/359,507

(22) Filed: Jan. 27, 2012

(65) Prior Publication Data

US 2013/0198511 A1  Aug. 1, 2013

(51) Int. Cl.
*H04L 29/06* (2006.01)
(52) U.S. Cl.
USPC ............................. 713/156; 713/151; 726/10
(58) Field of Classification Search
None
See application file for complete search history.

(56) References Cited

U.S. PATENT DOCUMENTS

| 7,739,494 | B1 | 6/2010 | McCorkendale et al. | |
|---|---|---|---|---|
| 8,327,128 | B1 * | 12/2012 | Prince et al. | 713/150 |
| 2003/0069973 | A1 * | 4/2003 | Ganesan et al. | 709/226 |
| 2007/0177731 | A1 | 8/2007 | Spies et al. | |
| 2008/0010448 | A1 | 1/2008 | Sabnis et al. | |
| 2008/0040794 | A1 | 2/2008 | Larson | |
| 2008/0263215 | A1 | 10/2008 | Schnellbaecher | |
| 2010/0057837 | A1 | 3/2010 | Yoo et al. | |
| 2010/0275012 | A1 | 10/2010 | Kido et al. | |
| 2012/0170753 | A1 * | 7/2012 | Pandrangi et al. | 380/286 |
| 2013/0155861 | A1 * | 6/2013 | Bryers et al. | 370/235 |

OTHER PUBLICATIONS

"Simplify SSL Certificate Management Across the Enterprise", Retrieved at <<http://www.verisign.com/static/012374.pdf>>, White Paper, Retrieved Date: Nov. 21, 2011, pp. 7.
Rescorla, E., "HTTP Over TLS", Retrieved at <<http://www.ietf.org/rfc/rfc2818.txt>>, May 2000, pp. 15.
"SAN Certificates", Retrieved at <<http://www.digicert.com/subject-alternative-name.htm>>, Retrieved Date: Nov. 21, 2011, pp. 2.
Vratonjic, et al., "The Inconvenient Truth about Web Certificates", Retrieved at <<https:// rud.is/b/weis2011/The%20Inconvenient%20Truth%20about% 20Web%20Certificates.pdf>>, Sep. 23, 2011, pp. 1-27.
"Central and Implicit Certificate Management", 13069032, Filed Date: Mar. 22, 2011, pp. 29.

* cited by examiner

*Primary Examiner* — Kaveh Abrishamkar
(74) *Attorney, Agent, or Firm* — James Sfekas; Katherine Drakos; Micky Minas

(57) ABSTRACT

Embodiments disclose a reverse lookup using an IP:Port-to-hostname table to identify a hostname when only an IP address and port is present in an SSL hello connection, which may occur, for example, when a non-SNI-capable client initiates the SSL hello. Once the hostname is successfully looked up, a naming convention is used to simplify the management and identification of SSL certificates. Different types of SSL certificates are supported. Multiple hostname matches may be associated with a given IP address and port in the IP:Port-to-hostname table. In such case, the first-matching hostname is always used with the naming convention to identify related SSL certificates. The naming convention is applied in such a way that it will first look for the most matching file name to the least matching file name.

20 Claims, 6 Drawing Sheets

US 8,738,902 B2

IMPLICIT SSL CERTIFICATE MANAGEMENT WITHOUT SERVER NAME INDICATION (SNI)

BACKGROUND

Secure Sockets Layer (SSL)/Transport Layer Security (TLS) is primarily used to encrypt confidential data sent over an insecure network, such as the Internet. In the HTTPS protocol, the types of data encrypted include the URL, the HTTP header, cookies, and data submitted through forms. A Web page secured with SSL/TLS has a URL that begins with "https://". The SSL/TLS security protocol is layered between the application protocol layer and TCP/IP layer, where it can secure and then send application data to the transport layer.

A SSL/TLS handshake protocol comprising a series of sequenced messages is used to negotiate the security parameters of a data transfer session. The SSL/TLS handshake begins with an initial Client Hello message that is sent to the web server. The Client Hello message contains a version number, randomly generated data, a session identification, a list of cipher suites available on the client, and a requested compression algorithm. Server Name Indication (SNI) is provided by TLS extensions, which allow clients to provide the name of the server they are contacting in the Client Hello message. The hostname contains the fully qualified DNS hostname of the server. This functionality is desirable, for example, to facilitate secure connections to servers that host multiple virtual servers at a single underlying network address.

The server responds to the Client Hello message with a Server Hello message. The Server Hello message includes a version number, randomly generated data, a session identification, a new or resumed session ID. If the client did not indicate a session to resume, then a new ID is generated. A new session ID is also generated when the client indicates a session to resume but the server can't or won't resume that session. This latter case also results in a new session ID, a cipher suite supported by both the client and server, and a compression algorithm. Specifies the compression algorithm to use (none currently supported).

The server also sends its SSL certificate to the client, which contains the server's public key that can be used to authenticate the server and to encrypt the premaster secret. The client checks the name of the server in the certificate to verify that it matches the name the client used to connect. If the user entered www.contoso.com as the URL in the browser, the certificate contains a subject name of www.contoso.com or *.contoso.com. The browser will warn the user if these names do not match, indicating that the server should not be trusted. In addition to being able to encrypt the data, SSL/TLS also ensures that the client is indeed communicating to the server that it has intended by ensuring that the domain name in the URL matches the subject name of the certificate that has returned from the server.

The server then sends a Server Hello Done message indicating that the server is finished and awaiting a response from the client. Additional messages are used for key exchanges and to verify and complete the SSL/TLS handshake.

Typically, with an exception of a wildcard SSL certificate or a SSL certificate with multiple subject names, a SSL certificate is issued for a specific site with matching subject for the domain name of the site. This creates problems of scale because each website needs its own SSL certificate. Accordingly, if there are million secure websites, then a million SSL certificates are needed. It can be a daunting problem for server administrators who are responsible for multiple websites to manage the SSL certificates for every website. Management of the SSL certificates can be especially difficult for administrators who support high-density hosting or cloud services. Additionally, because the SSL certificates expire annually, the on-going maintenance of the SSL certificates and the management of the one-to-one certificate/website associations is an on-going and time-consuming task.

The server admin must manage certificates for all of the websites on the server. Traditionally, when a client connects to a server over SSL/TLS, it can only identify the network end-point with IP:Port. Accordingly, in addition to managing certificates for all of the host websites, the admin must create a corresponding IP address for each website because each site wishes to maintain the standard SSL port, 443. This creates a scale problem for admins that host millions of web sites and, therefore, must manage millions of certificates and IP addresses.

SNI, by extending TLS, can now send the domain name, which is sometimes called virtual domain name, with the SSL Hello. With the domain name, the network end-point can now be uniquely identified using all three pieces of information, IP address, port and the domain name. This removes the need for the admin to create the million IP addresses since the same IP address and the port can remain constant, while the million unique domain names can be used to differentiate the web sites. However, the admin still has to create and manage the million certificates and must manage the one-to-one association between the million sites and the million certificates.

Using SNI, the SSL certificate corresponding to the site may be implied using a naming contract. For example, the SSL handshake from a SNI-capable client indicates that it is trying to connect to a particular domain name. In one such system, a naming contract dictates that the SSL certificate must be named <virtual domain name>.pfx. For example, for a domain such as www.contoso.com, the web service may use "www.contoso.com.pfx" as the name of the SSL certificate corresponding to the site. A system using this ".pfx" naming convention is described in pending U.S. patent application Ser. No. 13/069,032, titled "Central and Implicit Certificate Management" and filed Mar. 22, 2011, the disclosure of which is hereby incorporated by reference herein in its entirety.

Although such a naming convention eliminates the need to maintain the time-consuming, explicit one-to-one mapping, it has a hard dependency on the availability of the domain name at the time of SSL Client Hello, which is offered only by SNI-capable clients. The adoption of SNI across all clients is approximately 65%-75% as of September 2011, which leaves 25%-35% of all clients not SNI-capable. As a result, the naming convention that has a hard dependency on SNI alone is not ready for general consumption.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments remove the hard dependency on SNI for using such naming convention to simplify the management of SSL certificates, so that both SNI-capable and non-SNI-capable browsers are supported. In addition, the system supports different types of SSL certificates, such as certificates with one subject name, certificates with one subject name with star sub-domain (known as a "wildcard certificate"), and certificates with multiple subject names.

Embodiments provide an IP:Port-to-hostname reverse lookup capability. An IP:Port-to-hostname table is generated based on the configuration options in the web server. The table associates IP address/port number pairs with one or more hostnames. Using this table, the web server is able to "reverse lookup" a hostname using only the IP address and port from an SSL hello connection, as is the case when a non-SNI-capable client initiates the SSL hello.

Once the host name is successfully looked up, the same naming convention is used to simplify management of SSL certificates. The naming convention between the SSL certificate and the site no longer has the hard dependency on SNI.

Embodiments also support different types of SSL certificates. When the server performs the reverse lookup, there may be multiple hostnames that match given an IP address/port number. In such case, the server will always use the first matching hostname and apply a naming convention to search for the associated SSL certificate. Because the web server can always use the first matching hostname, the server does not need to scan the entire IP:Port-to-hostname table to see if there are duplicates, but it will exit upon finding the first match.

These embodiments satisfy all three types of SSL certificates because the server applies the naming convention in such a way that it will first look for the most-matching file name to the least-matching file name. More specifically, the server will first try to look for a corresponding certificate with a file name "www.<hostname>.pfx". If no such file exists, then the server will automatically retry a less-matching file name "_.<hostname>.com.pfx" where the underscore character "_" signifies the wildcard in a "wildcard certificate". As used in the examples herein, the underscore "_" is a specific example of the naming contract. However, it will be understood that any character can be defined by the naming convention as a wildcard. In addition, the naming convention dictates that for a certificate with multiple subject names, there need to be as many files as there are subject names, even though the SSL certificate file itself is identical.

Based on above configuration, the web server is successfully able to generate the IP:Port-to-hostname table and further leverages the specific behaviors of SSL certificates to successfully maintain the correctness of the SSL behavior, even though the "reverse lookup" always relies on the first matching hostname.

DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
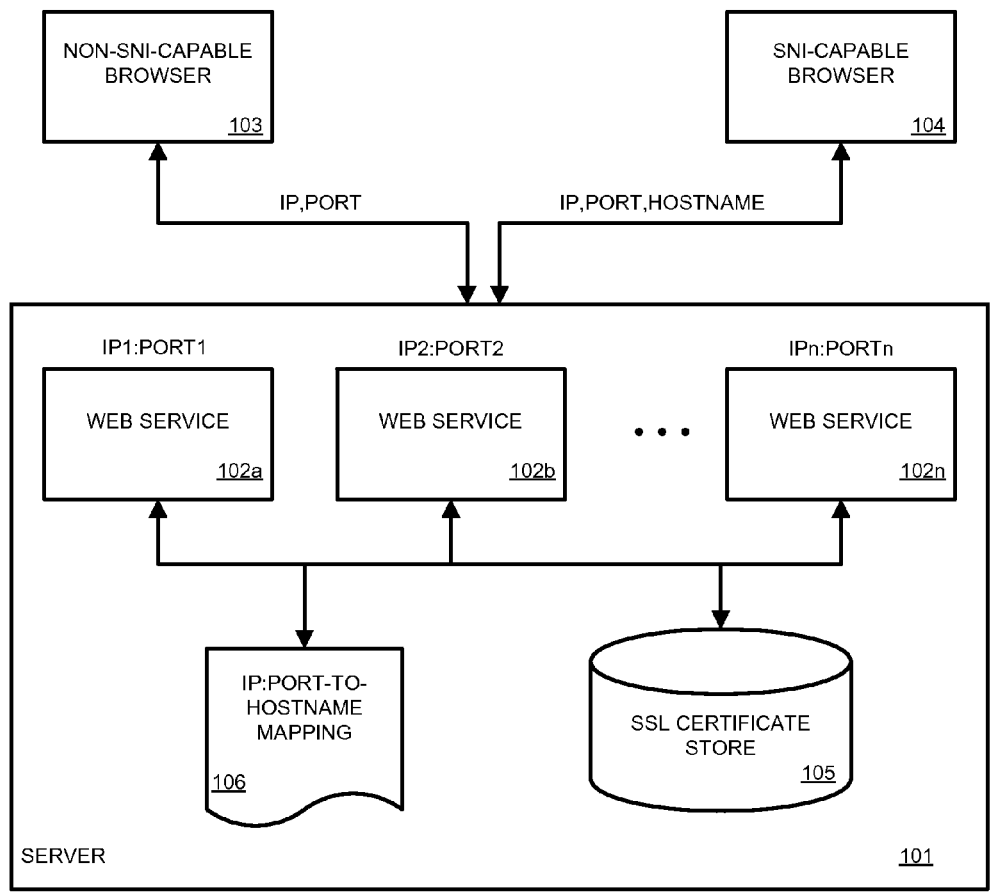
FIG. 1 is a block diagram of a system supporting both SNI-capable browsers and non-SNI-capable browsers according to one embodiment.

The Secure Sockets Layer (SSL) and Transport Layer Security (TLS) protocols are used to provide security for communications over the Internet between browser clients and web servers. Server Name Indication (SNI) extends the TLS protocols to indicate a hostname that a browser is attempting to reach. SNI allows a server to use multiple SSL certificates for the same IP address and port number, which allows multiple secure (i.e. https://) websites to be served by the same IP address and port. Some older browsers and servers do not support SNI.

There are three different types of SSL certificates: an SSL certificate with one subject name, a certificate with one subject name with star sub-domain ("wildcard certificate"), and a certificate with multiple subject names. Embodiments of the systems and methods described herein support all three types of SSL certificates.

When a browser client attempts to access a web site, the server looks for a hostname in the SSL hello connection from the browser. SNI-capable browsers will include the hostname when establishing the connection. When a non-SNI-capable browser initiates the SSL hello connection, an IP address and port number are present with the SSL hello connection, but not the hostname.

In one embodiment, the web server generates an IP:Port-to-hostname table that relates IP addresses and port numbers to hostnames. Once a hostname is identified, the naming convention can be applied to the hostname to identify the corresponding SSL certificates. Using this table, the web server is able to perform a reverse lookup of the IP address and port number to find the appropriate the hostname. Using the hostname from the IP:Port-to-hostname table, the web server can look up the appropriate SSL certificate.

The web server uses a particular naming convention for the SSL certificates that allows the server to find the appropriate certificate for each hostname. In one embodiment, the extension "PFX" is added to the hostname(s) in the SSL certificate to name the stored certificate file. For example, the SSL certificate is named "<hostname>.pfx" and is stored on the web server in a local cache or is stored in a central certificate store or file server. The naming convention is used to simplify the management of SSL certificates. The naming convention allows for the server to imply the corresponding SSL certificate based on the hostname, which eliminates the management of explicit 1-to-1 mapping between sites and SSL certificates. Although the extension "PFX" is used in examples herein, it will be understood that any other extension may also be used to name the SSL certificates. The web server may look up the SSL certificates using the hostname as modified by adding the appropriate extension.

Embodiments of the web server support all of the different types of SSL certificates. When the server performs a lookup in the IP:Port-to-hostname table, there may be multiple hostname matches to a given IP address and port. This may occur, for example, if a web server is hosting multiple web pages at the same IP address and port. In the case where multiple hostnames match an IP address and port, the server will always use the first matching hostname and will apply the naming convention (i.e. adding the "PFX" extension) to that hostname. Because the web server can always use the first matching hostname in this embodiment, the server actually does not need to scan the entire IP:Port-to-hostname table to see if there are duplicates. Instead, the web server will exit from the table upon finding the first IP:Port-to-hostname match.

The use of the IP:Port-to-hostname table works with all three types of SSL certificates. For example, there may be the following bindings (IP/Port/Hostname) for a site with multiple sub-domains:

64.4.6.100/443/images.contoso.com 64.4.6.100/443/members.contoso.com 64.4.6.100/443/secure.contoso.com The website hosting these sub-domains may use an SSL wildcard certificate. The wildcard certificate in this case is for *.contoso.com. Using the naming convention, this wildcard certificate would be stored using the name "_.contoso.com.pfx" where the "PFX" extension has been added to the hostname and the "_" represents the star ("*") in the wildcard certificate.

The web server would generate the following IP:Port-to-hostname table for these bindings:

TABLE 1

| IP ADDRESS | PORT | HOSTNAME |
|---|---|---|
| 64.4.6.100 | 443 | images.contoso.com |
| 64.4.6.100 | 443 | members.contoso.com |
| 64.4.6.100 | 443 | secure.contoso.com |

A site with multiple domains may have the following bindings (IP/Port/Hostname):

192.168.0.1/443/www.contoso.com 192.168.0.1/443/www.example.com

The website hosting these multiple domains may use an SSL certificate with multiple domains. The SSL certificate in this case would list both www.contoso.com and www.example.com. Using the naming convention, this certificate would be stored multiple times by applying the naming convention to each of the domains listed in the certificate. The certificate would be stored one time using the name "www.contoso.com.pfx" and then stored a second time using the name "www.example.com.pfx." Accordingly, in one embodiment, the naming convention dictates that for SSL certificates with multiple subject names, there needs to be as many "PFX" files as there are subject names, even though the SSL certificate files are identical.

The web server would generate the following IP:Port-to-hostname table for these bindings:

TABLE 2

| IP ADDRESS | PORT | HOSTNAME |
|---|---|---|
| 192.168.0.1 | 443 | www.contoso.com |
| 192.168.0.1 | 443 | www.example.com |

When a non-SNI-capable browser attempts to reach a website on the server, the browser sends an IP address and port number, but no hostname. The server uses the IP address and port number to look up the host name in the IP:Port-to-hostname table. As illustrated in Tables 1 and 2 above, there may be multiple certificates that correspond to the IP address/port number. In one embodiment, the web server uses the first listed hostname in the IP:Port-to-hostname table and applies the naming convention. For example, if the first hostname that corresponds to the IP address/port number is www.contoso.com, then the server will first look for a corresponding certificate with a file name "www.contoso.com.pfx." If no such file exists, then the server will automatically retry using a less-matching file name having the format "_.contoso.com.pfx."

FIG. 1 is a block diagram of a system supporting both SNI-capable browsers and non-SNI-capable browsers according to one embodiment. Server 101 supports web sites for a number of tenants using web service instances 102a-n. The endpoint for each tenant is identified using an IP address ($IP_n$) and a port number ($PORT_n$). Client browsers 103 and 104 communicate with the web sites using the IP address and port number. In other embodiments, groups of one or more of web service instances 102a-n may be located on two or more separate servers.

SSL certificates may be maintained in SSL certificate store 105 for use with secure web sites. In a multi-tenant environment, SSL certificate store 105 may be used to simplify the management of the SSL certificates on server 101. Instead of replicating certificates across each web service instance 102, the web services 102 may access the SSL certificates on the common store 105. The SSL certificates are stored using the naming convention discussed above. In particular, single name certificates and certificate with multiple subject names are stored using the format www.domain.com.pfx for each domain listed in the certificates. Wildcard SSL certificates are stored using the format "_.domain.com.pfx" for the top-level domain in the certificate. In other embodiments, each web service 102 may have a local cache that is used to store one or more SSL certificates, such as recently used SSL certificates.

When an SNI-capable browser 104 access a web service 102, the SSL hello includes the hostname (e.g. "www.contoso.com") in the TLS extension. The server 101 looks for the corresponding certificate in local cache, if one is available. If there is a cache miss, the server 101 uses the hostname (www.contoso.com) to look up the certificate in the SSL certificate store 105. The server 101 uses the naming convention (www.contoso.com.pfx) to find the certificate on file server 105.

When a non-SNI-capable browser 103 accesses a web service 102, it does not send the hostname, but only sends the IP address and port number. The IP address and Port are always available; however, the hostname is not available from non-SNI-capable browser 103. To find the SSL certificate, server 101 performs a reverse lookup in IP:Port-to-hostname mapping 106 using the IP address/port number to find the appropriate hostname. As illustrated in Tables 1 and 2 above, the IP address/port number may be correlated to one or more hostnames. Server 101 obtains the first-listed hostname found in IP:Port-to-hostname mapping 106 (e.g. www.contoso.com). Server 101 then uses the naming convention (e.g. www.contoso.com.pfx) to search for the SSL certificate on the remote file server 105. This search identifies the appropriate single name SSL certificate or certificate with multiple subject names, if one exists. If no SSL certificate is found that matches the first attempt (i.e. www.contoso.com.pfx), then server 101 uses the alternate naming convention (e.g. _.contoso.com.pfx) and searches the remote file server 105 again. This search identifies the appropriate wildcard SSL certificate, if one exists.

Figure 2:
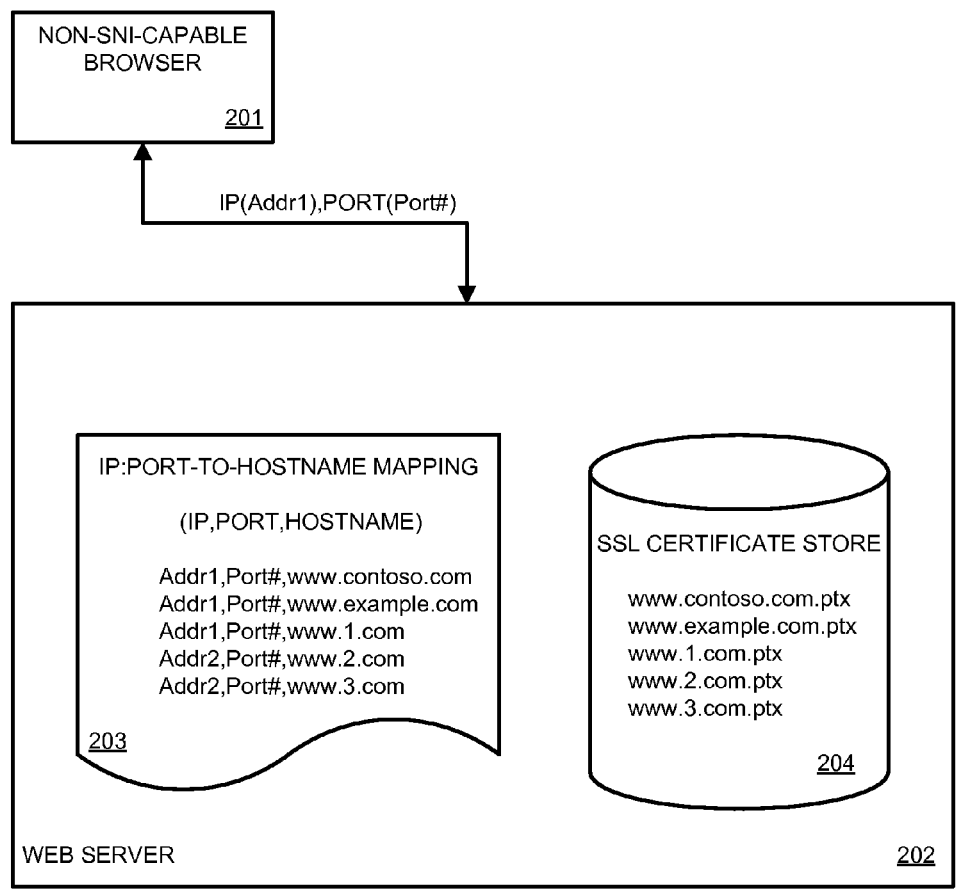
FIG. 2 is a block diagram illustrating a system supporting a non-SNI-capable browser communicating with a web server having a single-name SSL certificate or an SSL certificate with multiple subject names according to one embodiment.

FIG. 2 is a block diagram illustrating a system supporting a non-SNI-capable browser 201 communicating with a web server 202 having a single-name SSL certificate or certificate with multiple subject names according to one embodiment. Web server 202 includes an IP:Port-to-hostname mapping 203 that identifies combinations of IP addresses/port numbers/hostnames that are supported. Web server 202 also includes an SSL certificate store 204 that holds one or more SSL certificates. The SSL certificates are named using the naming convention described above, wherein the "PFX" extension is added to the domain name listed in the SSL certificate. If an SSL certificate with multiple subject names is present, then that certificate is stored multiple times using the naming convention for each subject name listed in the certificate.

Browser 201 does not support SNI and, therefore, does not send a hostname in the TLS extension of the SSL hello. Instead, browser 201 sends just an IP address (Addr1) and a port number (Port#) to web server 202. Server 202 determines that a hostname has not been provided. Using the IP address/port number, server 202 references IP:Port-to-hostname mapping 203 to identify the hostname that is associated with the information sent by browser 201.

In the case of an SSL certificate with one subject name, the certificate can only be used with one domain name, such as www.contoso.com. In the context of the IP:Port-to-hostname table 203, there will be only one line-item for this certificate. Because there is only one line-item, the web server 202 will use the naming convention to search for that domain name in the SSL certificate store 204. The web server 202 will end the SSL certificate search upon finding the first match (e.g. www.contoso.com.pfx) in the SSL certificate store 204.

In the case of an SSL certificate with multiple subject names, the certificate is designed to work with multiple domain names, such as www.contoso.com, www.example.com, and www.1.com. Web server stores the SSL certificate with multiple subject names one time for each domain listed in the certificate. Accordingly, the files www.contoso.com.pfx, www.example.com.pfx, and www.1.com.pfx are copies of the same SSL certificate saved under different names.

In the context of the IP:Port-to-hostname table 203, there may be multiple line-items for this certificate depending upon how many of the listed domains are configured on web server 202. The web server 202 uses the hostname for the first IP address/port name match from table 203 (e.g. www.contoso.com). The web server 202 uses the naming convention to search for that domain name in the SSL certificate store 204. The web server 202 will end the SSL certificate search upon finding the first match (e.g. www.contoso.com.pfx) in the SSL certificate store 204.

Even if browser 201 is attempting to reach the www.example.com or www.1.com domains instead of www.contoso.com, the process will still obtain the correct SSL certificate. Since these domains all use the same SSL certificate with multiple subject names, this SSL certificate has been saved under multiple names. Therefore, any domain that shares the same SSL certificate can be used as a search variable to find the associated certificate.

Figure 3:
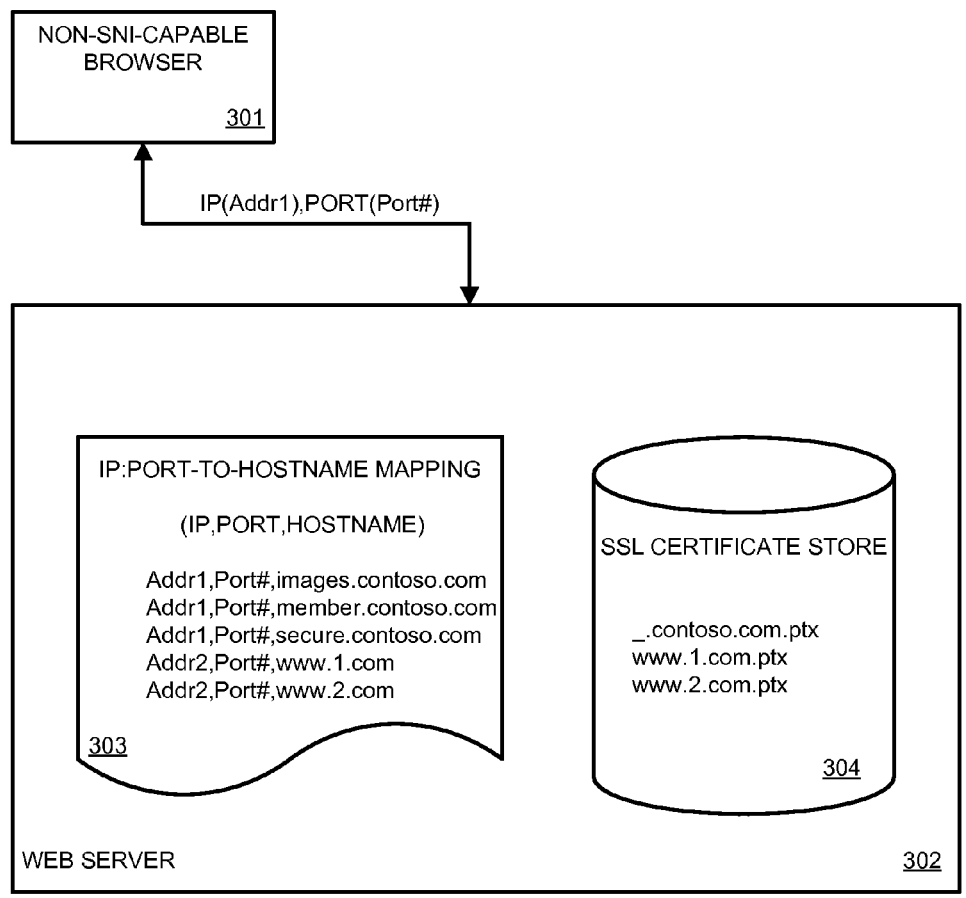
FIG. 3 is a block diagram illustrating a system supporting a non-SNI-capable browser communicating with a web server having a wildcard SSL certificate according to one embodiment.

FIG. 3 is a block diagram illustrating a system supporting a non-SNI-capable browser 301 communicating with a web server 302 having a wildcard SSL certificate according to one embodiment. Web server 302 includes an IP:Port-to-hostname mapping 303 that identifies combinations of IP addresses/port numbers/hostnames that are supported. Web server 302 also includes an SSL certificate store 304 that holds one or more SSL certificates. The SSL certificates are named using the naming convention described above, wherein the "PFX" extension is added to the domain name listed in the SSL certificate. Additionally, when a wildcard SSL certificate is present, then that certificate is stored using the format _.domain.pfx according to the naming convention for sub-domains listed in the certificate.

Browser 301 does not support SNI and, therefore, does not send a hostname in the TLS extension of the SSL hello. Instead, browser 301 sends just an IP address (Addr1) and a port number (Port#) to web server 302. Server 302 determines that a hostname has not been provided. Using the IP address/port number, server 302 references IP:Port-to-hostname mapping 303 to identify the hostname that is associated with the information sent by browser 301.

In the case of a wildcard SSL certificate, the same certificate can be used for multiple sub-domains, as long as the domain name remains the same. More specifically, a SSL certificate subject name with *.contoso.com can be used for any of the sub-domains, such as images.contoso.com, members.contoso.com, secure.contoso.com and so on.

In the context of the IP:Port-to-hostname table 303, there may be multiple line-items for this certificate depending upon how many of the listed domains are configured on web server 302. The web server 302 uses the hostname for the first IP address/port name match from table 303 (e.g. images.contoso.com). The web server 302 uses the naming convention (i.e. adding "PFX" to the hostname) to search the SSL certificate store 304. In the case of a wildcard SSL certificate, the web server 302 will not find a match in the SSL certificate store 304 using the first default search parameter (i.e. www.images.contoso.com.pfx).

When the first attempt fails, web server 302 uses the alternate search form with a wild card character (e.g. _.contoso.com.pfx). This search parameter will result in a match to the _. contoso.com.pfx SSL certificate in store 304. The web server 302 will end the SSL certificate search upon finding this match in the SSL certificate store 304.

Even if browser 301 is attempting to reach the member.contoso.com or secure.contoso.com domains instead of images.contoso.com, the process will still obtain the correct SSL certificate since these domains all use the same wildcard SSL certificate. Therefore, the wildcard domain search for the top-level domain can be used as a search variable to find the proper certificate for any of the sub-domains.

Because there are multiple domain names, exiting upon finding the first match is functionally correct because of the retry logic mentioned above. The naming contact dictates that the wildcard certificate is named _.contoso.com.pfx. If images.contoso.com is the first matching hostname, the server will first try looking for images.contoso.com.pfx which would not be found. Then the retry logic kicks in and tries to look for _.contoso.com.pfx, which would be found. And because, by definition, *.contoso.com certificate can be used for any sub domain, it works correctly with images.contoso.com.

As illustrated in the example of FIG. 3, it does not matter if the first matching hostname is images.contoso.com, members.contoso.com, or secure.contoso.com. They will all initially result in a "file not found" error, but the web server will correctly locate the SSL certificate using the alternate _.contoso.com.pfx search, which, by definition, will work with all of the sub-domains.

Figure 4:
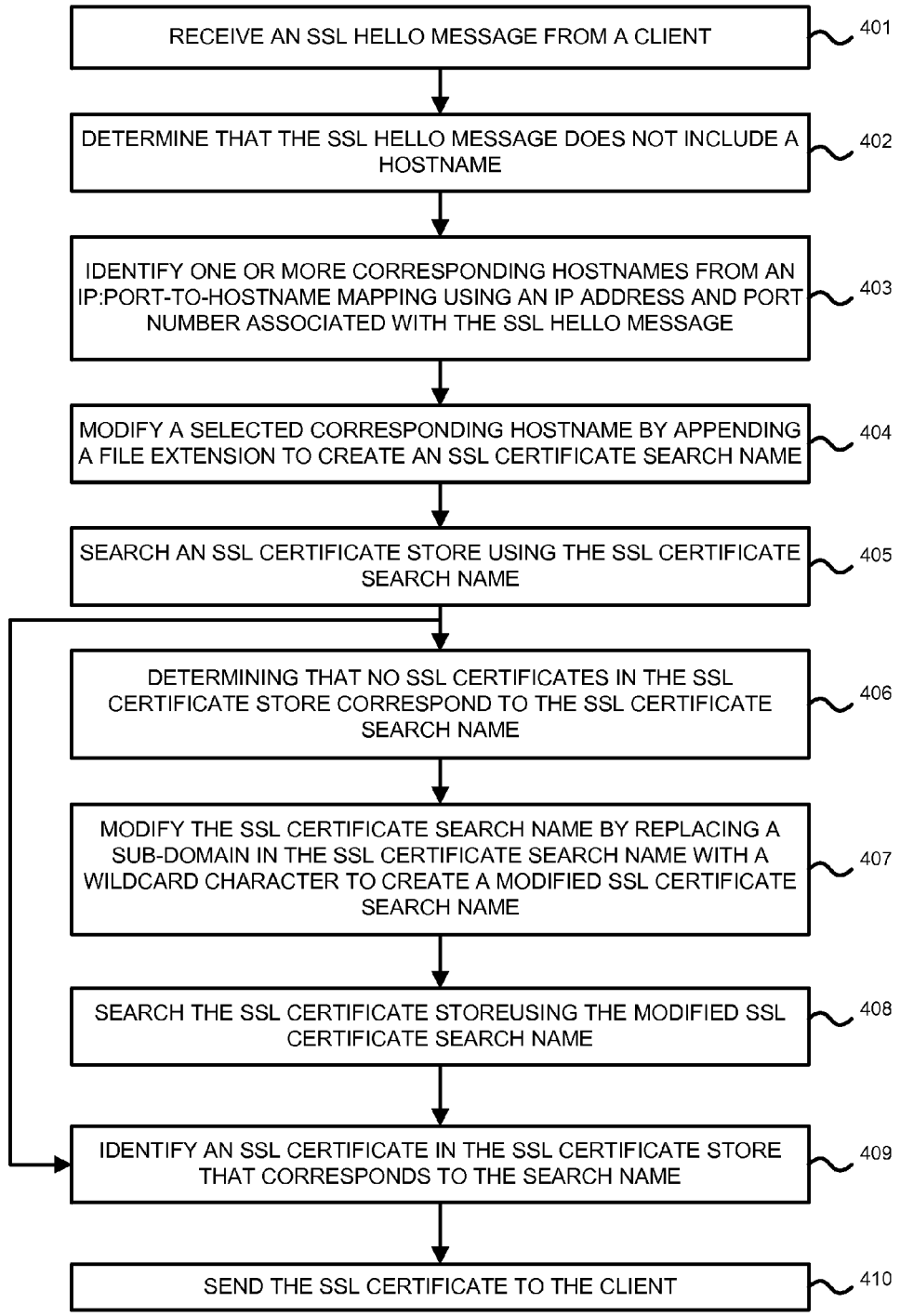
FIG. 4 is a flowchart of a method or process for identifying SSL certificates on a web server.

FIG. 4 is a flowchart of a method or process for identifying SSL certificates on a web server. In step 401, the web server receives an SSL Hello message from a client. In step 402, the web server determines that the SSL Hello message does not include a hostname. In step 403, using an IP address associated with the SSL Hello message, one or more corresponding hostnames are identified from an IP address-to-hostname mapping. The web server selects one of the hostnames to search for an SSL certificate. In one embodiment, the selected hostname is the first-listed hostname (e.g. images.contoso.com) of the one or more corresponding hostnames in the IP address-to-hostname mapping.

In step 404, the selected hostname is modified by appending a file extension (e.g. .pfx) to create an SSL certificate search name (e.g. images.contoso.com.pfx). In step 405, the newly created SSL certificate search name is used to search an SSL certificate store. If an SSL certificate is identified in the SSL certificate store that corresponds to the SSL certificate search name then the process moves to step 409, and that SSL certificate is sent to the client in step 410.

If no SSL certificate is identified that corresponds to the SSL certificate in step 406, then the SSL certificate search name is modified in step 407 to create a modified SSL certificate search name. The SSL certificate search name may be modified by replacing a sub-domain (e.g. images.) in the SSL certificate search name with a wildcard character (e.g. "_"). The modified SSL certificate search name (e.g. _.contoso.pfx) is used to search the SSL certificate store again in step 408. If an SSL certificate is identified in the SSL certificate store that corresponds to the modified SSL certificate search name then the process moves to step 409, and that SSL certificate is sent to the client in step 410.

The selected hostname and SSL certificate search names may be modified using a naming convention as describe herein (i.e. appending a file extension and prepending a wildcard character) or using any other appropriate modification that supports searching for a stored SSL certificate.

Figure 5:
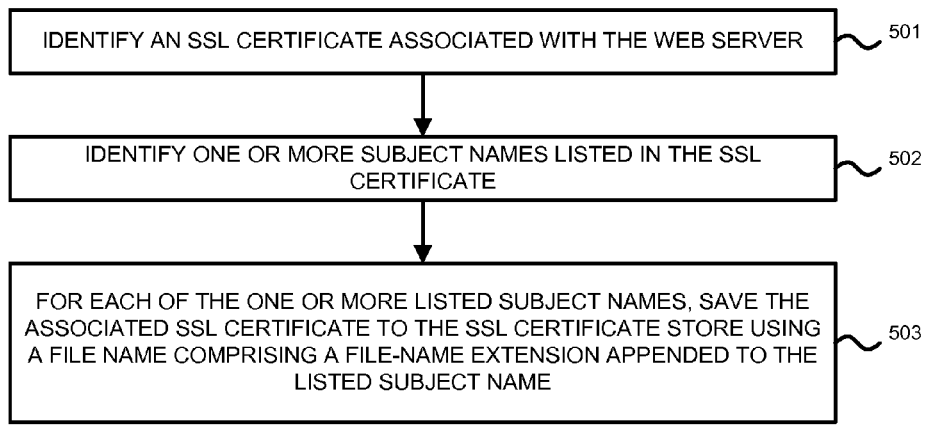
FIG. 5 is a flowchart of a method or process for storing a single-name SSL certificate or an SSL certificate with multiple subject names in an SSL certificate file store on a web server according to one embodiment.

FIG. 5 is a flowchart of a method or process for storing single-name SSL certificates or certificates with multiple subject names in an SSL certificate file store on a web server according to one embodiment. In step 501, an SSL certificate is identified as being associated with the web server, such as by identifying a domain hosted on the web server that is listed in the SSL certificate. In step 502, one or more subject names listed in the SSL certificate are identified. In step 503, for each of the one or more listed subject names, the associated SSL certificate is saved to the SSL certificate store. Each time the SSL certificate is saved a different file name is used. Each file name comprises a file-name extension appended to one or the listed subject names.

Figure 6:
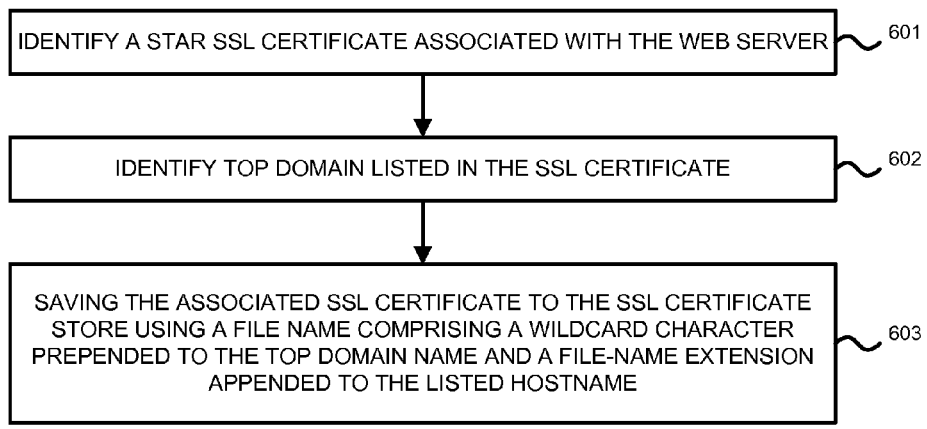
FIG. 6 is a flowchart of a method or process for storing wildcard SSL certificates in an SSL certificate file store on a web server according to one embodiment.

FIG. 6 is a flowchart of a method or process for storing wildcard SSL certificates in an SSL certificate file store on a web server according to one embodiment. In step 601, a wildcard SSL certificate is identified as being associated with the web server. In step 602, a top domain name listed in the SSL certificate is identified (e.g., *.contoso.com). In step 603, the SSL certificate is saved to the SSL certificate store using a file name comprising a wildcard character prepended to the top domain name and the file-name extension appended to the listed hostname (e.g. _.contoso.com.pfx).

It will be understood that steps 401-410 in FIG. 4, steps 501-503 in FIG. 5, and steps 601-603 in FIG. 6 may be executed simultaneously and/or sequentially. It will be further understood that each step may be performed in any order and may be performed once or repetitiously.

Figure 7:
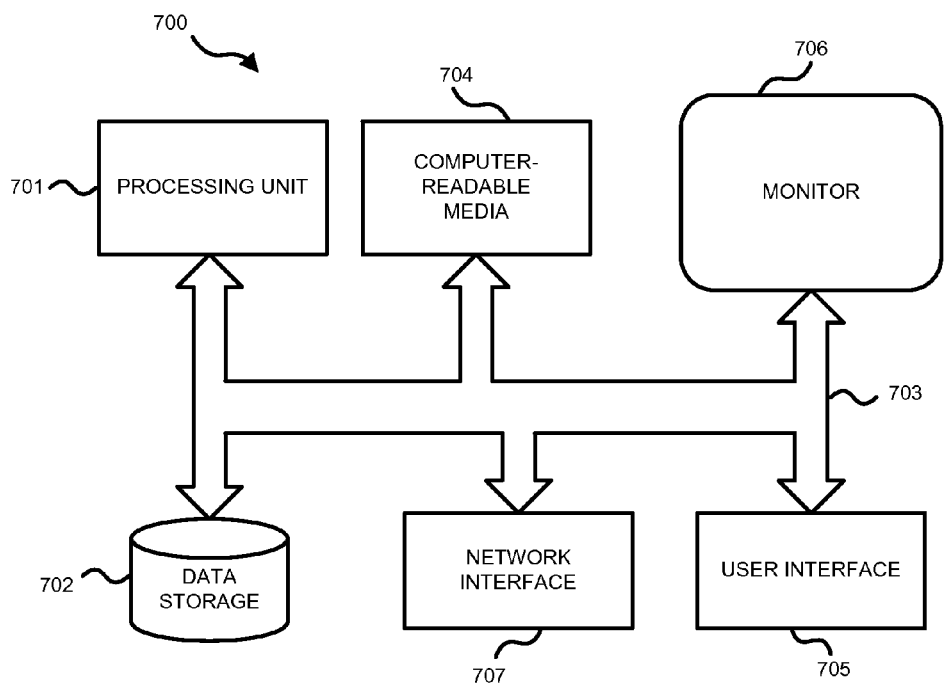
FIG. 7 illustrates an example of a suitable computing and networking environment on which the examples of FIGS. 1-6 may be implemented.

FIG. 7 illustrates an example of a suitable computing and networking environment 700 on which the examples of FIGS. 1-6 may be implemented. The computing system environment 700 is only one example of a suitable computing environment and is not intended to suggest any limitation as to the scope of use or functionality of the invention. The invention is operational with numerous other general purpose or special purpose computing system environments or configurations. Examples of well-known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 7, an exemplary system for implementing various aspects of the invention may include a general purpose computing device in the form of a computer 700. Components may include, but are not limited to, processing unit 701, data storage 702, such as a system memory, and system bus 703 that couples various system components including the data storage 702 to the processing unit 701. The system bus 703 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 700 typically includes a variety of computer-readable media 704. Computer-readable media 704 may be any available media that can be accessed by the computer 701 and includes both volatile and nonvolatile media, and removable and non-removable media, but excludes propagated signals. By way of example, and not limitation, computer-readable media 704 may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 700. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media. Computer-readable media may be embodied as a computer program product, such as software stored on computer storage media.

The data storage or system memory 702 includes computer storage media in the form of volatile and/or nonvolatile memory such as read only memory (ROM) and random access memory (RAM). A basic input/output system (BIOS), containing the basic routines that help to transfer information between elements within computer 700, such as during start-up, is typically stored in ROM. RAM typically contains data and/or program modules that are immediately accessible to and/or presently being operated on by processing unit 701. By way of example, and not limitation, data storage 702 holds an operating system, application programs, and other program modules and program data.

Data storage 702 may also include other removable/non-removable, volatile/nonvolatile computer storage media. By way of example only, data storage 702 may be a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The drives and their associated computer storage media, described above and illustrated in FIG. 7, provide storage of computer-readable instructions, data structures, program modules and other data for the computer 700.

A user may enter commands and information through a user interface 705 or other input devices such as a tablet, electronic digitizer, a microphone, keyboard, and/or pointing device, commonly referred to as mouse, trackball or touch pad. Other input devices may include a joystick, game pad, satellite dish, scanner, or the like. Additionally, voice input or natural user interface (NUI) may be used. These and other input devices are often connected to the processing unit 701 through a user input interface 705 that is coupled to the system bus 703, but may be connected by other interface and bus structures, such as a parallel port, game port or a universal serial bus (USB). A monitor 706 or other type of display device is also connected to the system bus 703 via an interface, such as a video interface. The monitor 706 may also be integrated with a touch-screen panel or the like. Note that the monitor and/or touch screen panel can be physically coupled to a housing in which the computing device 700 is incorporated, such as in a tablet-type personal computer. In addition, computers such as the computing device 700 may also include other peripheral output devices such as speakers and printer, which may be connected through an output peripheral interface or the like.

The computer 700 may operate in a networked environment using logical connections 707 to one or more remote computers, such as a remote computer. The remote computer may be a personal computer, a server, a router, a network PC, a peer device or other common network node, and typically includes many or all of the elements described above relative to the computer 700. The logical connections depicted in FIG. 7 include one or more local area networks (LAN) and one or more wide area networks (WAN), but may also include other networks. Such networking environments are commonplace in offices, enterprise-wide computer networks, intranets and the Internet.

When used in a LAN networking environment, the computer 700 may be connected to a LAN through a network interface or adapter 707. When used in a WAN networking environment, the computer 700 typically includes a modem or other means for establishing communications over the WAN, such as the Internet. The modem, which may be internal or external, may be connected to the system bus 703 via the network interface 707 or other appropriate mechanism. A wireless networking component such as comprising an interface and antenna may be coupled through a suitable device such as an access point or peer computer to a WAN or LAN. In a networked environment, program modules depicted relative to the computer 700, or portions thereof, may be stored in the remote memory storage device. It may be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method performed by a web server, comprising:
receiving an SSL Hello message from a client;
determining that the SSL Hello message does not include a hostname;
identifying one or more corresponding hostnames from an IP:Port-to-hostname mapping using an IP address and port associated with the SSL Hello message;
modifying a selected corresponding hostname to create an SSL certificate search name; and
searching an SSL certificate store using the SSL certificate search name.

2. The method of claim 1, further comprising:
identifying an SSL certificate in the SSL certificate store that corresponds to the SSL certificate search name; and
sending the SSL certificate to the client.

3. The method of claim 1, wherein the selected corresponding hostname is a first-listed hostname of the one or more corresponding hostnames from the IP:Port-to-hostname mapping.

4. The method of claim 1, further comprising:
modifying the selected corresponding hostname using a naming convention by adding a file-name extension to the selected corresponding hostname to create the SSL certificate search name.

5. The method of claim 4, wherein the file-name extension is .pfx.

6. The method of claim 1, further comprising:
determining that no SSL certificates in the SSL certificate store correspond to the SSL certificate search name;

modifying the SSL certificate search name to create a modified SSL certificate search name; and using the modified SSL certificate search name to search the SSL certificate store.

7. The method of claim 6, further comprising:

modifying the SSL certificate search name using a naming convention by replacing a sub-domain in the SSL certificate search name with a wildcard character.

8. The method of claim 7, wherein the wildcard character is an underscore character.

9. The method of claim 1, wherein the IP:Port-to-hostname mapping comprises entries that associate an IP:Port to multiple hostnames.

10. The method of claim 1, wherein the IP:Port-to-hostname mapping comprises one or more entries that associate an IP address paired with a port number to a hostname.

11. The method of claim 4, further comprising:

identifying an SSL certificate associated with the web server;

identifying one or more hostnames listed in the SSL certificate; and for each of the one or more listed hostnames, saving the associated SSL certificate to the SSL certificate store using a file name comprising the file-name extension appended to the listed hostname.

12. The method of claim 4, further comprising:

identifying a wildcard SSL certificate associated with the web server;

identifying a top domain name listed in the SSL certificate; and saving the associated SSL certificate to the SSL certificate store using a file name comprising a wildcard character prepended to the top domain name and the file-name extension appended to the listed hostname.

13. A computer system, comprising:

one or more processors;

system memory;

one or more computer-readable storage media having stored thereon computer-executable instructions that, when executed by the one or more processors, causes the processors to perform a method for identifying SSL certificates, the processor operating to:

receive an SSL Hello message from a client;

identify one or more corresponding hostnames from an IP:Port-to-hostname mapping using an IP address and port associated with the SSL Hello message;

modify a selected corresponding hostname to create an SSL certificate search name; and search an SSL certificate store using the SSL certificate search name.

14. The computer system of claim 13, the processor further operating to:

identify an SSL certificate in the SSL certificate store that corresponds to the SSL certificate search name; and send the SSL certificate to the client.

15. The computer system of claim 13, the processor further operating to:

modify the selected corresponding hostname using a naming convention by adding a file-name extension to the selected corresponding hostname to create the SSL certificate search name.

16. The computer system of claim 13, the processor further operating to:

determine that no SSL certificates in the SSL certificate store correspond to the SSL certificate search name;

modify the SSL certificate search name to create a modified SSL certificate search name; and search the SSL certificate store using the modified SSL certificate search name.

17. The computer system of claim 13, the processor further operating to:

identify an SSL certificate associated with the web server;

identify one or more hostnames listed in the SSL certificate; and for each of the one or more listed hostnames, saving the associated SSL certificate to the SSL certificate store using a file name comprising the file-name extension appended to the listed hostname.

18. The computer system of claim 16, the processor further operating to:

identify a wildcard SSL certificate associated with the web server;

identify a top domain name listed in the SSL certificate; and saving the associated SSL certificate to the SSL certificate store using a file name comprising a wildcard character prepended to the top domain name and the file-name extension appended to the listed hostname.

19. A computer program product for implementing a method for identifying SSL certificates on a web server, the computer program product comprising one or more computer-readable storage media having stored thereon computer-executable instructions that, when executed by one or more processors of a computing system, cause the computing system to perform the method comprising of:

receive an SSL Hello message from a client;

identify one or more corresponding hostnames from an IP:Port-to-hostname mapping using an IP address and port associated with the SSL Hello message;

modify a selected corresponding hostname by adding a file-name extension to create an SSL certificate search name; and search an SSL certificate store using the SSL certificate search name.

20. The computer program product of claim 19, further comprising:

determine that no SSL certificates in the SSL certificate store correspond to the SSL certificate search name;

modify the SSL certificate search name to create a modified SSL certificate search name; and search the SSL certificate store using the modified SSL certificate search name.

* * * * *